– – – – –

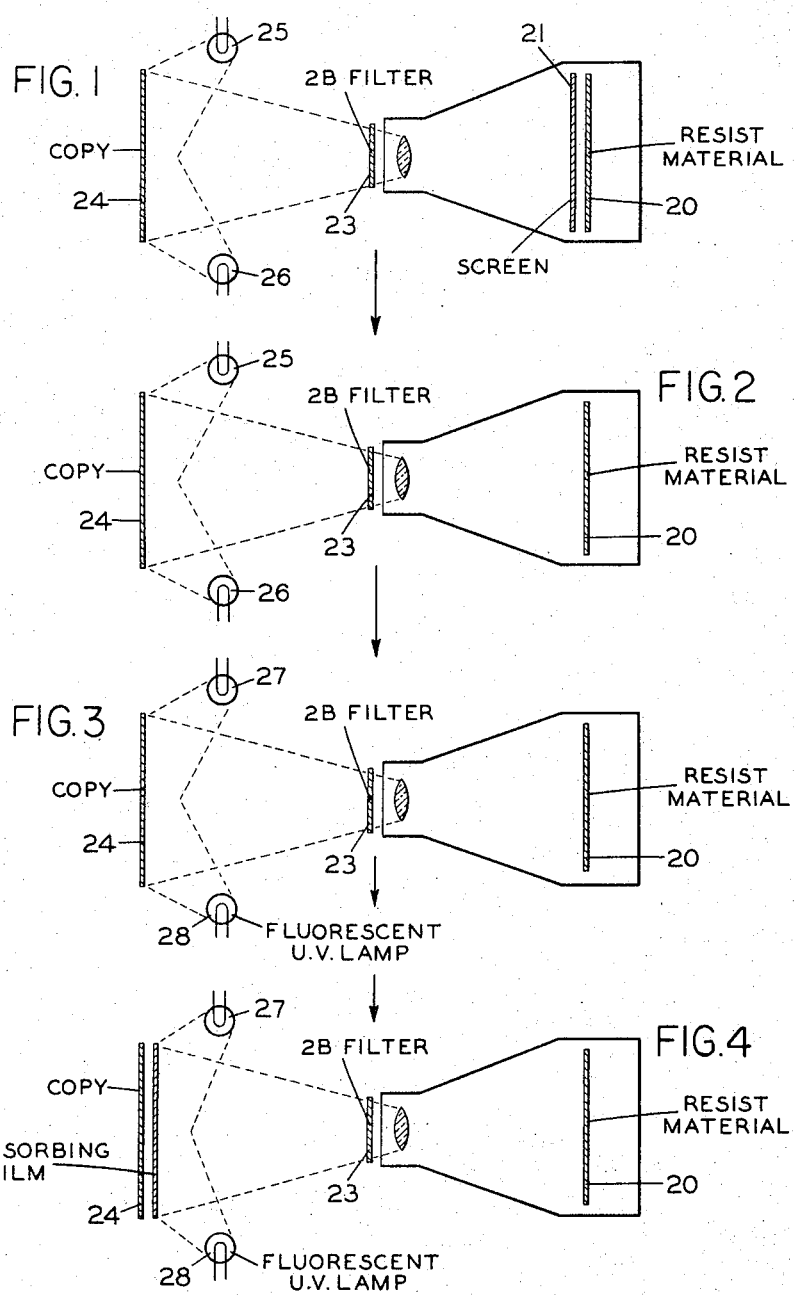

United States Patent Office 3,375,111
Patented Mar. 26, 1968

3,375,111
PREPARATION OF PRINTING PLATES AND CYLINDERS WITH RESIST-FORMING FILM USED DIRECTLY IN A CAMERA
Marcel Verdooner, Demarest, N.J., William A. Milanese, Jr., Huntington, N.Y., and Hermann Kott, Essex Fells, N.J., assignors to Publication Corporation, New York, N.Y., a corporation of New York
Continuation-in-part of application Ser. No. 365,680, May 7, 1964. This application Feb. 9, 1965, Ser. No. 431,394
8 Claims. (Cl. 96—38)

ABSTRACT OF THE DISCLOSURE

A process of making printing plates and cylinders in which copy material is exposed on high contrast orthochromatic resist-forming film in a camera by making screen and continuous tone exposures with white light free of ultraviolet light to avoid the loss of tone gradation and to improve dot formation and further exposing the resist material by illuminating the copy material with ultraviolet light to accentuate highlights or drop out portions of the copy treated with fluorescent material and filtering out ultraviolet light entering the camera so that the highlights and drop out areas are exposed on the film entirely by fluorescent light from the copy material.

---

This is a continuation-in-part of our U.S. application Ser. No. 365,680 filed May 7, 1964, now abandoned.

This invention relates to the preparation of printing plates and cylinders, and, more particularly to methods for preparing resists for etching intaglio plates, cylinders and the like.

In the U.S. patents to Kott, Nos. 2,628,903 and 2,907,657, the nature of and techniques for using high contrast orthochromatic resist-forming film such as "Rotofilm" are disclosed. A typical resist-forming film is a stripping film having a light-sensitive emulsion mounted on a stripping membrane which is in turn supported by a stable film base. This film is considerably more light sensitive than the conventional carbon tissue, so that the exposure time and the time required to produce a resist are reduced very substantially. The methods for exposing the resist film, disclosed in the above-identified patents, involve screen-tone and continuous tone exposures of the film in a printing frame through a transparency of the subject matter by means of yellow light and blue light in order to control the contrast of the resist formed by exposure to the copy material.

In both the original and improved process the screen is removed between the yellow exposure and blue or ultraviolet exposures. This step, if improperly accomplished, may result in faulty register of the continuous tone image and screen-tone image.

The success of the Kott processes has led others to attempt to provide processes in which "Rotofilm" can be exposed in a camera to the copy material. These subsequently developed processes have left something to be desired for they require special camera diaphragms or screens and multiple exposure through these diaphragms or screens which frequently result in misregister and involve at least as many steps as the Kott processes while the quality of the reproduction of the copy is less satisfactory.

In accordance with the present invention, improved methods of making a resist are provided in which a high contrast, orthochromatic resist-forming film is exposed directly in a camera, using either front lighted copy materials such as photographic positives, drawings, paintings, repro proofs or the like or back-lighted transparencies.

In the preferred form of the invention, the resist material is exposed in a camera through a screen to a continuous tone copy (a screen-tone exposure) to produce a screened latent image of the copy and is further exposed in a camera to the copy of the absence of a screen (a continuous tone exposure).

The resist material is further treated, as for example, by burning out unwanted portions, and then developed and fixed to put it in condition for use in etching a plate or cylinder.

More particularly, we have discovered that by suitable treatment of the copy material with fluorescent materials or the preparation of the copy on fluorescent papers or films and multiple exposures of the resist material with light free of ultraviolet and with light causing the fluorescent portions of the copy to fluoresce, resists can be produced which enable the etching of printing cylinders and plates to reproduce the full range of tones of the copy material.

A basic rule to be followed in the preparation of copy is that all printing areas must be non-fluorescent and all non-printing areas must be fluorescent and that two illuminants must be used to photograph the copy, i.e., white light and ultraviolet light. White light is used to photograph the printing areas of the copy and ultraviolet light is used to render the fluorescent areas non-printing. White light, without ultraviolet radiation, enables the areas desired in the reproduction to be photographed on the resist material and produces the various densities on the resist-forming film which subsequently control the diffusion rate of an etchant and the size of the pockets or recesses etched in the printing surface. The ultraviolet exposure or exposures made under dark conditions excites the fluorescent parts of the copy material to wave lengths to which the resist material is sensitive and produces a density in corresponding areas of the resist material which precludes penetration of the etchant.

For a better understanding of the present invention, reference may be had to the accompanying drawing in which the four figures (FIGS. 1 to 4) illustrate diagrammatically and step by step in order a method of preparing a resist in accordance with the present invention.

In accordance with the invention, it is necessary to use copy treated with fluorescent materials. Accordingly, the non-printing portions, highlights or unwanted tones of the copy are rendered fluorescent by retouching or other means. For silhouette material, wash, pen, pencil or charcoal drawing, copy is made on fluorescent paper or printed on fluorescent photographic paper. The fluorescent papers and retouching materials should fluoresce in the blue-green range. The resist material is insensitive to red light and for reasons explained hereinafter fluorescence in the ultraviolet range is undesirable. Such papers and retouching materials are well known in the art and are available on the market. Fluorescent papers, paints or pigments are supplied by the Kemart Corporation of San Francisco, California. Similarly, fluorescent photographic papers on which prints are to be made are available from Gevaert under the name of "Multicontrast" and from Eastman Kodak under the name of "Velox."

By illuminating the copy with a light source which excites the fluorescent material and transforms the initial illuminating energy to a wave length or wave lengths for which the resist material has a greater sensitivity than the initial illuminant, the film is substantially fully exposed in portions corresponding to the fluorescent treated areas of the copy.

In addition, suitable overlays may be prepared to enable areas of the copy material to be dropped or burned out in the resist or to enable printed matter to be inserted within the area of the copy material. For reasons explained hereinafter, the overlay may be a sheet of transparent material capable of filtering out ultraviolet radiation. Due to its transparency, it can be laid on the copy material and the areas to be dropped or burned out or where printing is not desired are coated, painted or printed with a fluorescent paint or pigment. The transparency of the sheet enables the coated areas to be located precisely within the area of the copy material.

Referring now to the drawing, a resist material such as "Rotofilm" is placed in a camera with a screen 21 interposed between the lens and the resist material. The particular type of screen used will, of course, depend upon the printing technique and quality desired. For example, a conventional gravure screen can be used to produce plates in which the cells are of constant area and vary only in depth to achieve the tonal gradations in the printed material. By employing vignetted dot contact screens, such as the Eastman magenta screen, both area and the depth of the cells in the etched plate can be varied, inasmuch as these screens have dots which vary in density from a substantially opaque center to a relatively translucent edge portion. Light passes relatively freely through the transparent background around the dots, less freely through the translucent edges, and is blocked out at the center, thereby producing a gradated image of the cells. The cells in the etched plates have rounded bottoms. Other types of screens, such as cross-lined screens, also can be used. All such screens will be referred to herein generally as half-tone screens. In this example, the screen 21 is an Eastman magenta screen.

The camera is equipped with an Eastman 2B filter 23. The 2B filter is a sharp cutting filter eliminating ultraviolet radiations. Other U.V. filters for filtering out radiations of 405 millimicrons and less, such as the Eastman 2A and 2C Wratten filters, may also be used. The copy material 24 prepared as described above is placed in front of the camera and a screen tone-exposure is made with pulsed xenon lights (white light) 25 and 26. The xenon light is filtered to eliminate U.V. radiation by interposing Pyrex U.V. filters between the lamps and the copy material. A suitable exposure is about 60 seconds at a light intensity of 400 foot candles.

With the Eastman magenta screen, the areas and densities of the cell latent images produced by the screen-tone exposure vary. The cell images corresponding to the dark portions of the copy remain substantially unchanged by the screen-tone exposure while the highlight and shade areas of the copy are exposed in a manner which tends, in various degrees, to produce a maximum density exposure at the translucent edges of the cells. The images of the opaque center dots of the screen receive, in the tone exposure, light in an amount which will produce a density in the developed resist inversely to the tonal value of the copy. Thus, with a vignetted dotted screen, such as the Eastman magenta screen, the screen-tone exposure tends to produce maximum density in the partially exposed portions of the resist-forming film corresponding to the translucent edges of the screen dots. The lighter the tone of the copy, the greater will be the area at the edges of the cell images which receive a maximum density exposure.

Following the screen tone exposure, the screen is removed and a continuous tone exposure of the copy 24 is made on the resist material through the 2B filter 23 with U.V. filtered pulsed xenon light at an intensity of about 400 foot candles for a period of twenty seconds.

The copy material 24 which has previously been treated in selected areas with fluoroscent pigments or presented on fluorescent paper in order to "drop out" portions of the copy as explained above, is now given "drop-out" exposure in a dark room with unfiltered General Electric Company fluorescent BLB lamps 27, 28 with a light intensity of 65 foot candles for about a period of thirty seconds. The 2B filter filters out the ultraviolet radiation thereby avoiding exposure of the non-fluorescing areas of the copy material while allowing the fluorescent light in the blue-green range emitted by the fluorescing areas of the copy material to expose and render very dense corresponding areas in the resist material 20. In the final step, an auxiliary drop-out exposure is made by interposing between the copy 24 and the camera an overlay 29 of ultraviolet absorbing film treated with fluorescent pigment in selected areas prepared as described above. The auxiliary drop-out exposure is made in the dark with the fluorescent lamps 27 and 28 for a period of about thirty seconds with a light intensity of 65 foot candles. The U.V. filtering properties of the overlay prevents the copying material from fluorescing, so that only the fluorescing portions of the overlay are exposed on the resist material. Following this exposure, the resist material is developed in a suitable hardening type of developer such as that disclosed in the Kott patent No. 2,907,657 as follows:

| | Ounce |
|---|---|
| Metol (298 grains) | 6 |
| Pot. metabisulfite (329 grains) | 33 |
| Sodium sulfite | 60 |
| Hydroquinone (19 grains) | 13 |
| Pyrogalic | 40 |
| Pot. bromide | 10 |

Eumercine concentrate, 10 cc.
Water to make fifty gallons.

"Rotofilm" is developed for about 2 minutes, drained for about 10 seconds, and then immersed in a 10% solution of sodium carbonate for about 2 minutes. Thereafter, the film is rinsed in water and fixed in a solution of hypo with boric acid. The film is fixed for about 3 minutes and then is washed for about 15 minutes and dried. The resist film can then be laid down on a cylinder or plate in the same way as carbon tissue. Inasmuch as "Rotofilm" has a gelatin coating on the base, the coating when wet will adhere to a lay-down roller and may cause detachment of the resist so that the use of a squeegee roller is advisable in applying the "Rotofilm" to the cylinder or plate.

The acetate or other type of stable base on the film can be removed by peeling it from the membrane which covers the emulsion. The membrane which is impermeable to water can be removed by the use of a solvent such as a mixture of one-third ethylene glycolmonoethyl ether, one-third acetone, one-third alcohol, and a little water. After soaking the membrane in this solution, it can then be removed with a squeegee. The resist can be further developed to remove soluble parts thereof by revolving the cylinder in water maintained at a temperature of 140° F. for about 10 minutes. After further washing, the resist may be dried and then is ready for etching.

Another typical method of exposing the resist material is as follows.

A first exposure is made by exposing the resist material through a screen in a camera to the copy material which is treated with fluorescent material as described above.

The camera has a No. 4 (yellow) filter and a 2B filter on the lens. An exposure time of 2½ minutes with U.V. filtered pulsed xenon lights is suitable.

A second exposure is then made with a U.V. filtered pulsed xenon light through a No. 30 filter (magenta) and a No. 96 neutral density filter of the copy material, with the No. 4 and 2B filters and the screen removed. An 18 second exposure is satisfactory.

A third "burn-out" exposure is then made with ultraviolet light through a 2B filter for a period of about 40 seconds and the resist is then developed and used for making a plate or cylinder as described above.

The processes described above are susceptible to modification by the addition of steps or elimination of steps, depending upon the nature of the copy material. Thus, it may be found desirable to provide a screen flash exposure prior to the screen-tone exposure. Such an exposure can be made in the absence of the copy material and with the screen and the resist material in the camera. In this exposure, white light with U.V. filtered pulsed xenon reflected from white paper in the copy holder may be used for a period of about 20 seconds at a light intensity of about 400 foot candles or such other equivalent exposure as may be found necessary to produce a latent screen image.

A typical screen-flash exposure is 10 seconds at a light intensity of 3 foot candles when the resist material is flashed outside the camera. The screen flash exposure should be of relatively low intensity and short duration to produce an overall screen pattern in the finished resist which enables large deep cells corresponding to the darkest portions of the printed material to be etched in the printing surface. The transparent portion of the screen which corresponds to the cell walls is substantially fully exposed. Where "Rotofilm" or other orthochromatic resist is used, the cell walls formed by the screen are fully exposed onto the film without any substantial exposure of the cells or dots, thus enabling a very well defined latent image of the screen to be formed in the resist.

In some instances, it may be desirable to screen-flash the resist with lamps inside the bellows of the camera. For example a pair of arcuate lamps of about 85° extent are mounted on the lens board of the camera substantially concentrically around the inner end of the lens tube to illuminate or flash the resist uniformly. Suitable lamps for this purpose (Chemco, 10 volt yellow lamps) are made by Chemco Photo Products, Inc., of Glen Cove, New York. These lamps when used in a camera having a lens with a 24 inch focal length and a 48 inch bellows extension provide a light intensity of approximately 35 foot candles in the film or resist plane. A typical flash exposure under these conditions is approximately 60 seconds.

With high contrast copy material, the screen-tone exposure of the copy material may be omitted and a continuous tone exposure in a camera is either preceded by or followed by a screen flash exposure, without the copy material, either in or out of the camera. It will be understood that if the "Rotofilm" is prescreened before use in the camera, it can be stored for later use. When such prescreened film is used in the camera, the continuous tone exposure may be given, as a typical example a 45 second exposure at 65 foot candles with pulsed xenon light. The other drop-out and auxiliary drop-out exposures described above may, of course, follow.

Any suitable type of camera may be used in making the above-described exposures having an in-line, prism, or an image reversal optical system.

It will be understood by those skilled in the art that the above-described embodiments of the process are merely exemplary and that they are susceptible of variation and modification without departing from the spirit and scope of the invention. Therefore, the invention is not deemed to be limited except as defined in the appended claims.

We claim:

1. In a process for preparing a resist for etching printing plates, cylinders and the like, the steps of exposing a resist-forming film in a camera through a half-tone contact screen to copy in which the non-printing portions fluoresce and the printing portions are non-fluorescent and illuminated with white light free of ultraviolet light for a time sufficient to produce a screen-tone image and exposing said resist-forming film in a camera to copy in the absence of a screen to produce continuous tone image.

2. The process claimed in claim 1 in which the copy is exposed onto said resist-forming film in the camera with a light source exciting the non-printing areas to cause them to fluoresce.

3. In a process for preparing a resist for etching printing plates, cylinders and the like, the steps of exposing a resist-forming film to a light source through a vignetted dot screen to produce a screen image and exposing said resist-forming film in a camera to copy having non-printing portions which fluoresce and printing portions which do not fluoresce and illuminated with white light free of ultraviolet radiation to produce a continuous tone image and again exposing said film in said camera through a filter eliminating ultraviolet radiation from said copy while said copy is illuminated with light having ultraviolet radiation causing said non-printing portions to fluoresce.

4. The process set forth in claim 3 comprising exposing said resist-forming film in said camera to said copy illuminated with light free of ultraviolet radiation and through said screen to form a latent screen image in said film in register with said continuous tone image.

5. The process set forth in claim 3 comprising applying fluorescent material to a transparent ultraviolet ray absorbing filter film in contact with said copy to cover at least one area of said copy to be rendered non-printing and exposing said resist-forming film in said camera to said copy through said filter film while illuminated with ultraviolet radiation causing fluorescence of said fluorescent material to expose said at least one area on said resist-forming film.

6. In a process for preparing a resist for etching printing plates, cylinders and the like comprising exposing said resist material in a camera to material to be copied through a vignetted dot screen to form a latent screened tone image in said resist, exposing said resist material in said camera directly to said material to be copied to form a latent continuous tone image in said resist material, both of said exposures being made with white light through a filter eliminating ultraviolet light and developing said resist material.

7. The process set forth in claim 6 comprising flash exposing said resist material in said camera through said screen to a light source in said camera to form a latent screen image in said resist material.

8. The process set forth in claim 6 comprising providing said copy with areas fluorescent under ultraviolet light and exposing said resist material in said camera to said copy through a filter eliminating ultraviolet radiation while said copy is illuminated with ultraviolet radiation to drop out in said latent image in said resist material areas corresponding to the fluorescent areas of said material to be copied.

References Cited

UNITED STATES PATENTS

| | | | |
|---|---|---|---|
| 2,628,903 | 2/1953 | Kott | 96—38 |
| 2,907,657 | 10/1959 | Kott | 96—38 |
| 3,179,519 | 4/1965 | Velton et al. | 96—38 |

OTHER REFERENCES

Adams, F. P., "The Photoengraver's Bulletin," November, 1950, pp. 109–111.

J. TRAVIS BROWN, *Acting Primary Examiner.*

NORMAN G. TORCHIN, *Examiner.*

R. H. SMITH, *Assistant Examiner.*